United States Patent [19]

Bower et al.

[11] Patent Number: 5,887,326
[45] Date of Patent: Mar. 30, 1999

[54] APPARATUS FOR INSERTING A LENS INTO AN EYEWEAR FRAME FRONT

[75] Inventors: Ross J. Bower, Rochester; Peter L. Eppeira, Spencerport, both of N.Y.

[73] Assignee: Bausch & Lomb Incorporated, Rochester, N.Y.

[21] Appl. No.: 904,503

[22] Filed: Aug. 1, 1997

[51] Int. Cl.$^6$ .............................. B23P 19/02; B23P 11/02; B23P 19/00

[52] U.S. Cl. ................. 29/251; 29/235; 29/450; 29/453; 29/700

[58] Field of Search .............................. 29/450, 453, 700, 29/251, 235

[56] References Cited

U.S. PATENT DOCUMENTS

| | | |
|---|---|---|
| D. 071,201 | 10/1926 | Neuwirth . |
| D. 129,994 | 10/1941 | Gorski . |
| 1,069,539 | 8/1913 | Evans, Jr. .................................. 29/251 |
| 2,408,693 | 10/1946 | Sidebotham .............................. 29/235 |
| 2,665,601 | 1/1954 | Heath ....................................... 81/3.5 |
| 3,330,331 | 7/1967 | Duckwall et al. ........................ 29/251 |
| 3,588,979 | 6/1971 | Miller ....................................... 29/251 |
| 3,605,239 | 9/1971 | Eschholz .................................. 29/251 |
| 3,884,561 | 5/1975 | Kodys ...................................... 351/83 |
| 4,054,376 | 10/1977 | Wareham ................................. 351/178 |
| 4,196,982 | 4/1980 | Watkins .................................... 351/86 |
| 4,300,317 | 11/1981 | Croft ..................................... 51/284 E |
| 4,540,534 | 9/1985 | Grendol .................................. 264/2.2 |
| 4,666,215 | 5/1987 | Toms, Jr. .................................. 29/235 |
| 5,387,950 | 2/1995 | Weltmann ............................... 351/178 |
| 5,503,694 | 4/1996 | Abrams .................................... 156/64 |
| 5,526,069 | 6/1996 | Tseng ....................................... 351/86 |

FOREIGN PATENT DOCUMENTS 2143457   2/1985   United Kingdom .................... 29/450

*Primary Examiner*—Larry I. Schwartz
*Assistant Examiner*—John Preta
*Attorney, Agent, or Firm*—Katherin McGuire

[57] ABSTRACT

Apparatus for inserting a lens into the eye opening of an eyewear frame front includes a lens-seating surface on which a lens is placed. The lens-seating surface is reciprocally movable within a lower block. An upper block is reciprocally movably along a common vertical axis with respect to the lower block such that the upper block can be alternately raised and lowered relative to the stationary lower block. The upper block releasably carries a stretching cone which is placed on top of the lens on the lens-seating surface; the upper block is then raised while leaving the cone on the lens, and the eye opening of a heated front frame is placed over the stretching cone. The upper block is again lowered to capture the frame portion surrounding the eye opening, and the lens-seating surface is raised to force the cone through the eye opening. Once the cone has passed entirely through the eye opening, the lens is positioned within the eye opening of the frame, and the upper block is raised, carrying the cone with it, and thus revealing the frame having the lens inserted within the eye opening.

16 Claims, 6 Drawing Sheets

APPARATUS FOR INSERTING A LENS INTO AN EYEWEAR FRAME FRONT

BACKGROUND OF THE INVENTION

The present invention relates to assembling of eyewear frame fronts, and more particularly relates to a semi-automatic method and apparatus for inserting a lens into a plastic eyewear frame front.

Plastic eyewear frame fronts are very popular due to their relatively low manufacturing cost, durability, and ability to be molded into a wide variety of style choices. Plastic eyewear frame fronts are typically molded into a single unit eyewear frame front which has right and left eye openings wherein respective right and left optical lenses (plano or prescription) are secured. The eye openings each have an eye groove which circumscribes the interior loop of the eye opening and wherein the beveled edge of the lens is fit in the assembled condition.

The present day method of inserting a lens into the eye opening of a plastic eyewear front involves first heating the frame front to temporarily increase its ductility to a point where the eye opening can be stretched open. The stretching of the eye opening is typically accomplished with a device known in the art as a "stretching cone" which is in the basic shape of the eye opening and tapers to an increasing diameter. The eye opening of the heated frame front is placed over the stretching cone and pressed toward the larger diameter end of the cone, thereby stretching the eye opening in a radially outward direction. Once the eye opening is stretched open to a point which is slightly larger than the corresponding diameter of the lens, the frame is taken off the stretching cone and the lens is manually pressed into the eye opening. The same stretching and pressing steps are lens is manually pressed into the eye opening. The same stretching and pressing steps are repeated for the opposite eye opening. As the frame front quickly cools, the eye openings shrink back to their unstretched state which radially compresses the eye opening about the lens, thereby securing the lens within its respective eye opening.

The above-described method of inserting a lens into a plastic frame front requires the worker to manually work the frame front to first stretch the eye openings thereof, and second to press the lens into the eye opening which must be done quickly so the lens edge is fit entirely within the eye groove before the eye opening has cooled and shrunk back to its original, unstretched state. Problems associated with this manual assembly method are numerous. Pressing of the lens within the eye opening requires manual manipulation of the frame front about the eye opening to urge and direct the lens edge within the eye groove about the full perimeters thereof. The frame front can be quite hot as it is removed from the frame front heating unit and workers many times burn their hands as they press the frame front over the stretching cone and then try to work the lens within the eye opening. Additionally, the manual manipulation of the frame front to press the lens within the opening is strenuous and requires a great deal of finger and wrist movement. Since one worker may handle over 600 frame fronts in one eight hour shift, the number of repetitive motion injuries to worker's hands and wrists is very high. Furthermore, the incidence of accidentally damaging a frame while attempting to insert a lens therein is very high due to the inherent inconsistency of manually working each frame.

SUMMARY OF THE INVENTION

The present invention provides a semi-automatic apparatus and method for assembling plastic frame fronts with lenses which eliminates the problems associated with the pure manual assembly method described above. A work station is provided having two main units: a frame front heating unit and a lens insertion machine. The frame front heating unit itself is standard to the industry. The lens insertion machine includes a lower block and an upper block which may be moved together and apart with the open cavities of each in facing relation to one another and forming a continuous internal chamber when the blocks are brought together. A pneumatic ram which includes a lens-seating surface is telescopically positioned within the lower block cavity and is reciprocally movable therein. A stretching cone is releasably secured within the cavity of the upper block.

To assemble the lens to the frame front, the operator places a lens into the bottom block in overlying relation to the lens-seating surface of the pneumatic ram. The machine is activated in its primary loading mode which moves the upper and lower blocks together and releases the stretching cone from the upper block. Once the stretching cone has released, the upper block moves away from the lower block, thereby leaving the stretching cone atop of the lens in the lower block. The operator then takes a heated frame front from the heating unit and places the eye opening thereof over the stretching cone. Once the frame front is in position, the operator initiates the lens insertion cycle of the machine.

The lens insertion cycle of the machine begins by the upper block lowering to the lower block which sandwiches the frame front between the facing surfaces of the lower and upper blocks which is thereby stationary with respect to the stretching cone. The pneumatic ram travels upwardly toward the upper block which pushes the stretching cone through the eye opening of the stationary frame front and into the upper block. Since the stretching cone gradually increases in diameter, the eye opening of the frame front is stretched to an increasing diameter as the cone is pushed therethrough. The pre-loaded lens and lens-seating surface of the pneumatic ram follows directly behind the stretching cone with the movement of the ram stopping at the point where the stretching cone has passed completely through the eye opening, at which point the lens is located within the eye opening of the frame front.

Once the movement of the ram has stopped, the machine lifts the upper block from the lower block, thereby revealing the frame front with the lens secured in the eye opening. Means are provided in the upper block to removably engage the stretching cone within the upper block at this point in the lens insertion cycle. The lens insertion operation is then repeated for the opposite eye opening. In an advantageous embodiment of the invention, a pair of identical lens insertion machines are positioned side-by-side at a single workstation such that two frames may be processed simultaneously in the manner described more fully below.

BRIEF DESCRIPTION OF THE DRAWINGS

FIG. 2b is an enlarged view of the portion of the right machine appearing above the work surface in FIG. 2a;

DETAILED DESCRIPTION

Figure 1:
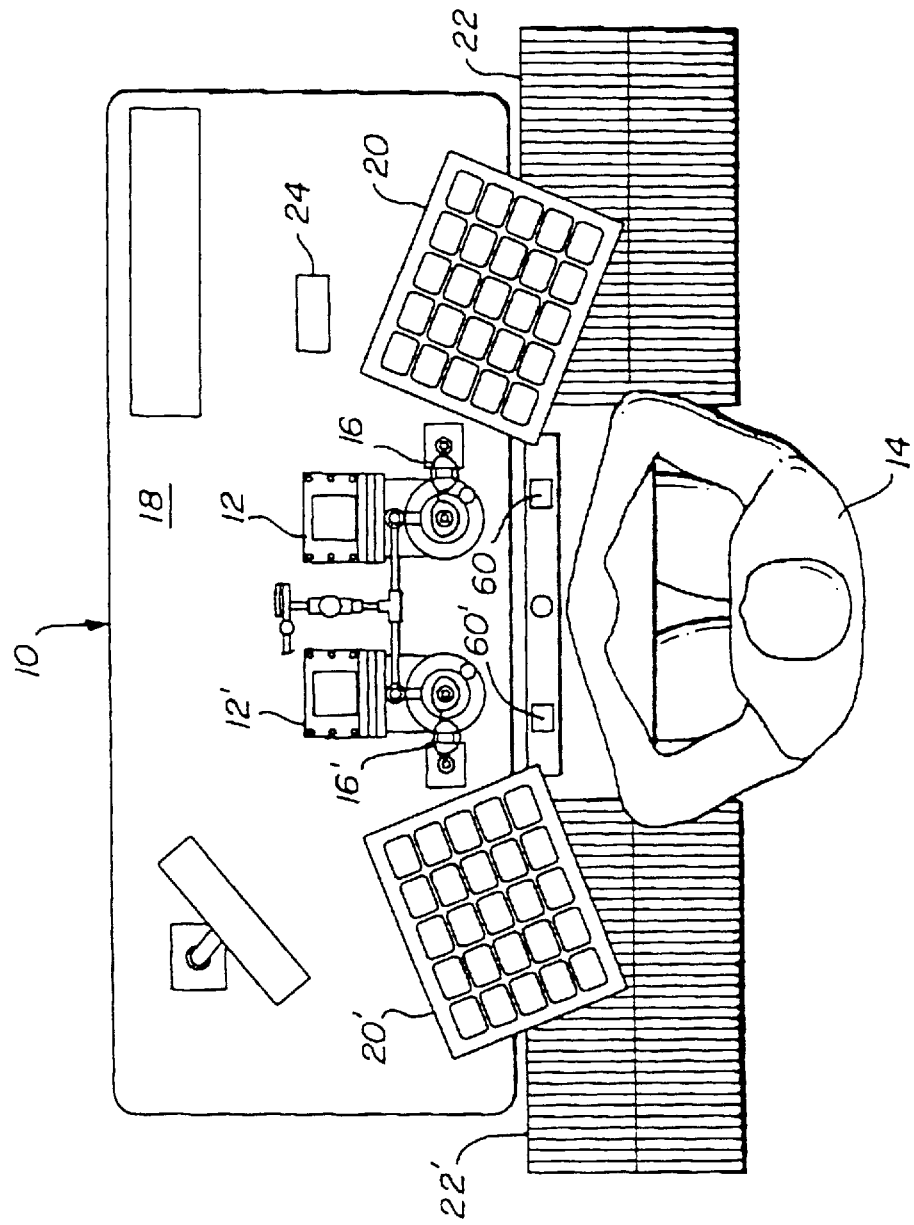
FIG. 1 is a top plan view of a work station incorporating two machines of the present invention.

The invention will be described herein in the context of a single operator work station such as seen generally at 10 in FIG. 1. To optimize work station output, two essentially identical mechanical lens insertion machines 12 and 12' are provided in side-by-side relation at a single work station so that an operator 14 can work on two frame fronts simultaneously. Since machines 12,12' are essentially identical, it is understood reference to one of the machines herein applies to the other machine as well, with the same parts in each machine being denoted by the same reference numeral, with the qualifier of a prime superscript for the parts of machine 12'.

It is understood that work station arrangements other than that shown and described herein may be utilized as required, with the number of lens insertion machines such as 12,12' varying from one to as many as is required. It is furthermore understood that the present invention, although semi-automatic in functionality as described herein, is readily adaptable to a fully automated manufacturing environment wherein the functions performed by the operator 14 described herein may be replaced by machinery performing equivalent functionality.

Referring still to FIG. 1, work station 10 includes two lens insertion machines 12,12' which are positioned in side-by-side relation to one another on a work surface 18 in front of a seated worker 14. A pair of trays 20,22 containing lenses and frame fronts, respectively, are provided adjacent the right side of worker 14, with a similar pair of trays 20',22' being provided adjacent the left side of worker 14.

Figure 2A:
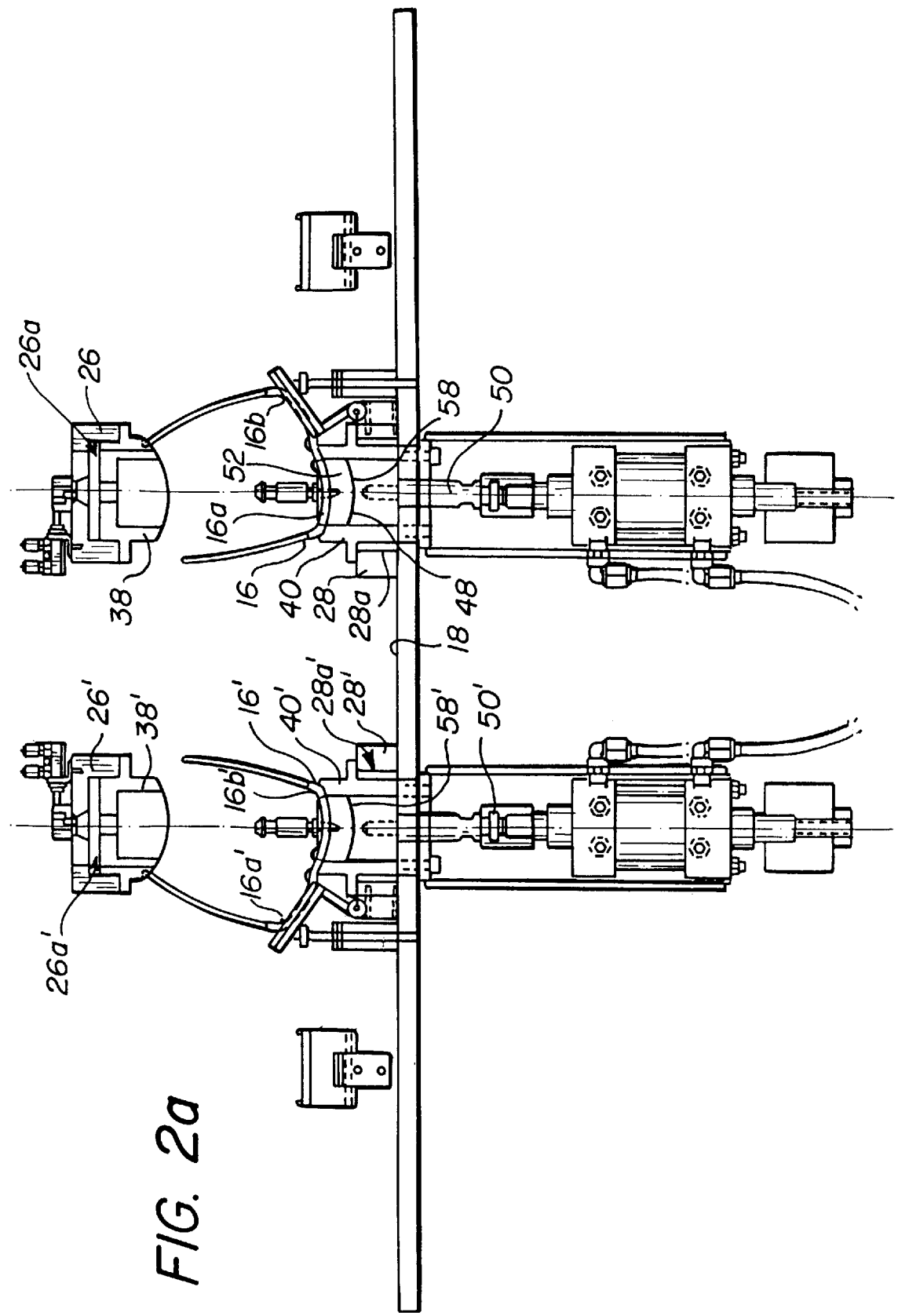
FIG. 2a is a front elevational view of FIG. 1, with portions thereof not shown for the sake of clarity.

Worker 14 takes a pair of frame fronts from the right and left frame trays 22,22', respectively, and places the frames in the heater unit 24. After the frames have reached a predetermined temperature, they are removed from the heater unit 24 and transferred to machines 12,12', respectively. As seen in FIGS. 1 and 2a, the opposite eye openings 16a,16b' of frames 16, 16' are inserted into machine 12,12', respectively. Once the lenses are fit into these eye openings, the frames 16,16' are switched to the opposite machine 12',12, respectively, for inserting a lens into the other eye opening of each. This "switching" of the frames between the machines 12,12' will be described in more detail later.

Machine 12 includes upper and lower blocks 26,28 each having an internal cavity 26a,28b, respectively, which are vertically oriented with respect to each other. Lower block 28 is bolted or otherwise secured to work surface 18 so that it is stationary with respect thereto. Upper block 26 is attached to and movable with a mounting bracket 30 which itself is attached and movable with the plunger 32 of a first pneumatic ram 34 (FIGS. 3a and b). Ram 34 is mounted to a beam 36 which is secured in vertical relation to horizontal work surface 18. In the fully extended position of plunger 32 (FIG. 3a), it is seen that upper block 26 lies directly above and closely adjacent lower block in vertically aligned relation thereto about a common vertical axis x—x. In the retracted position of plunger 32 (FIGS. 2a, 2b and 3b), upper block 26 moves along axis x—x to a position raised from lower block 28.

Figure 2B:
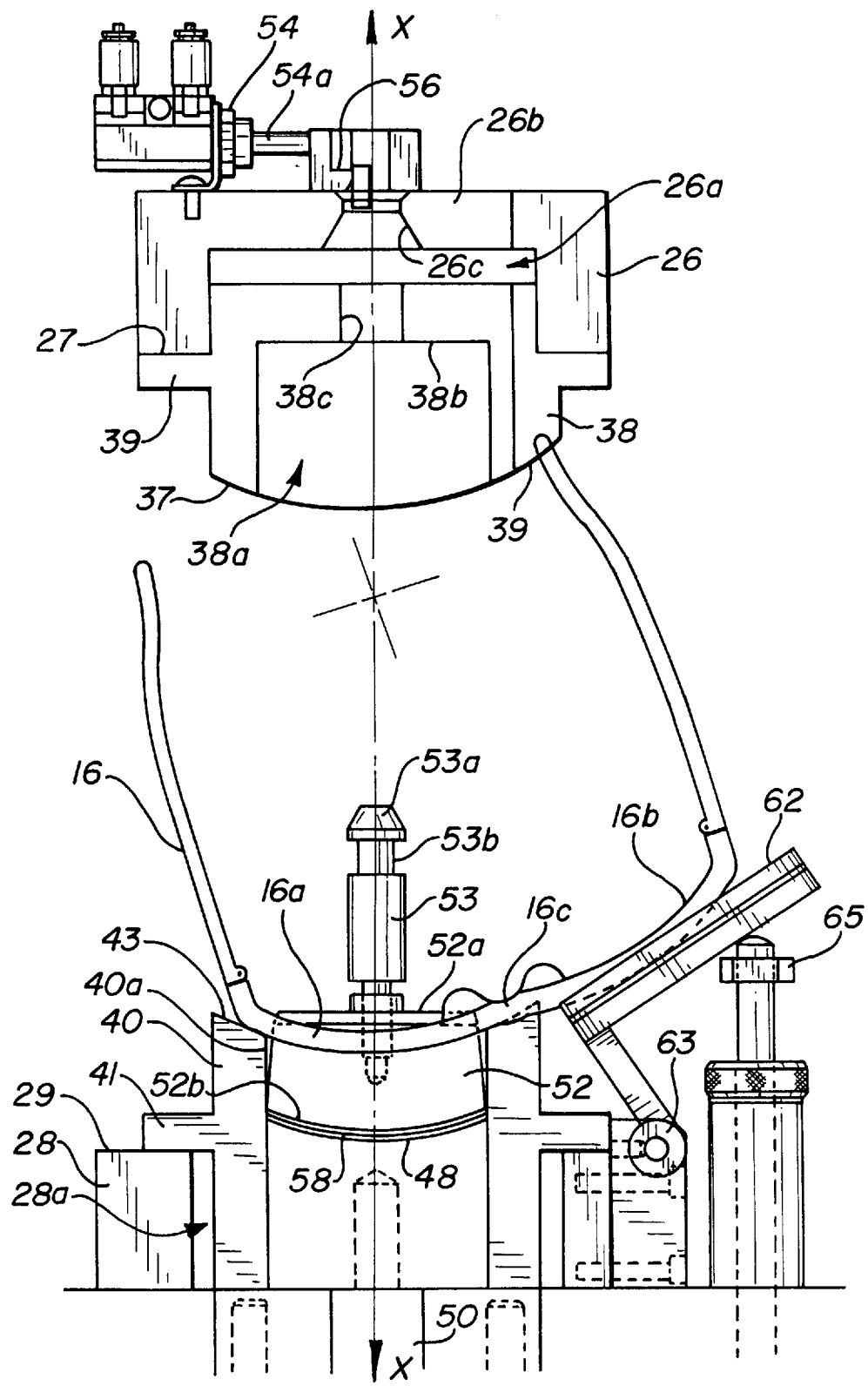
Figure 3A:
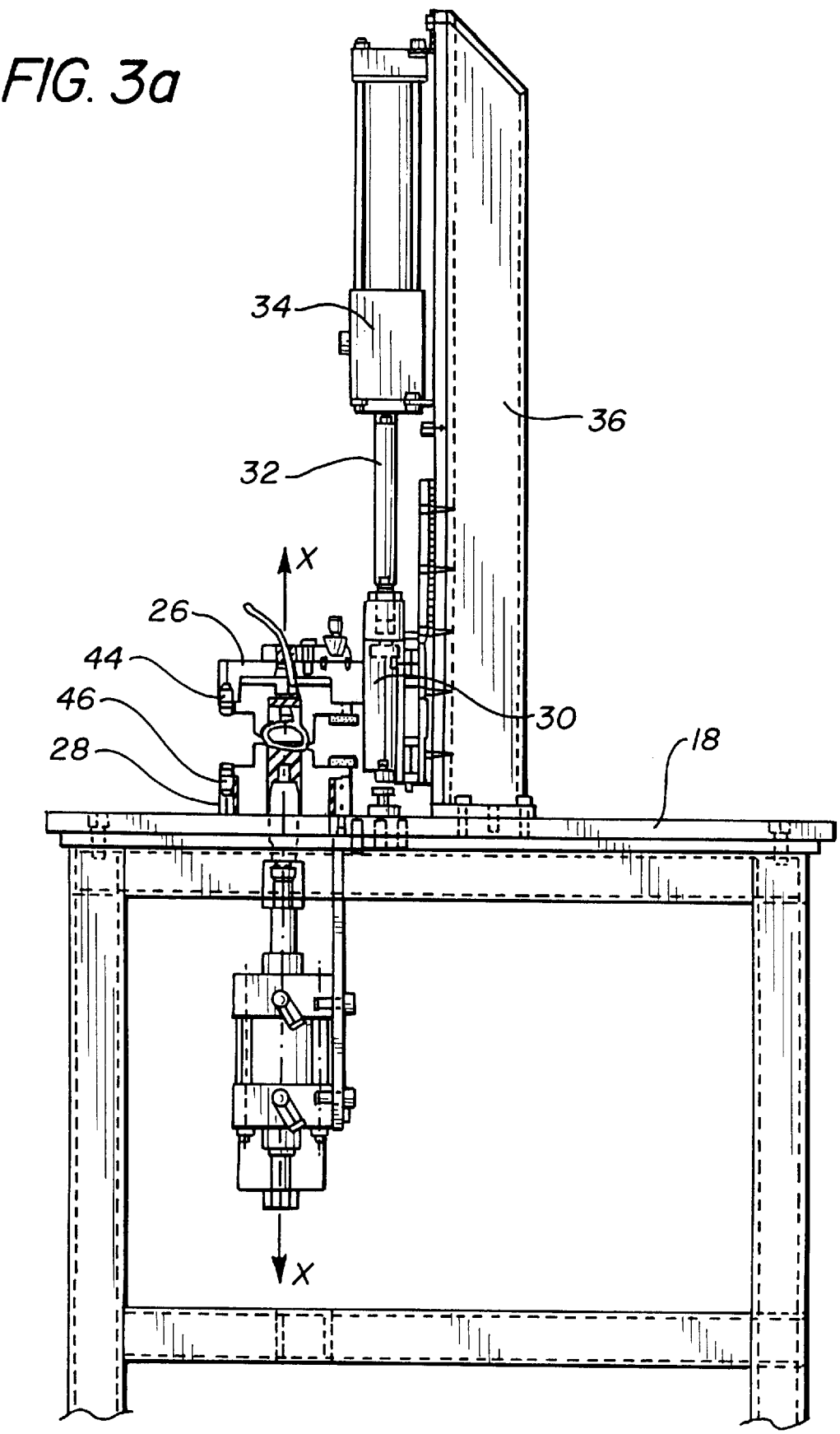
FIGS. 3a and 3b are side elevational views of a single lens insertion machine with the upper block thereof shown in the lowered and raised positions, respectively.
Figure 3B:
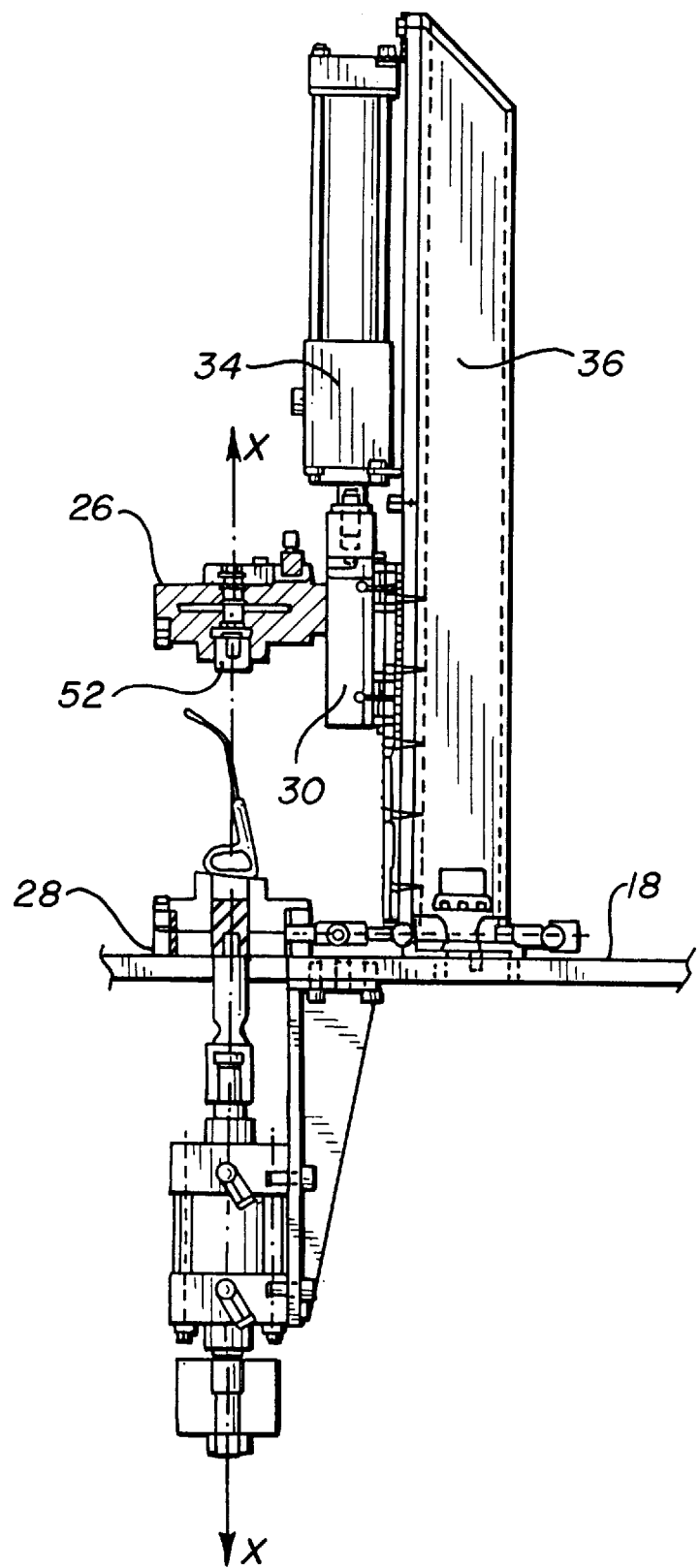

As seen best in FIG. 2b, a pair of inserts 38 and 40 are provided which are removably inserted into internal cavities 26a and 28a of upper and lower blocks 26,28, respectively. Inserts 38,40 each include an internal cavity 38a,40a and a protruding neck portion 39,41, encircling the outside surface thereof. When inserts 38,40 are fully inserted into cavities 26a,28a of upper and lower blocks 26,28, neck portions 39,41 engage the facing surfaces 27,29 of the upper and lower blocks 26,28, respectively. A pair of securing screws 44,46 may be passed through holes formed in the peripheries of upper block 26 and insert 38, and lower block 28 and insert 40, respectively, to retain the insert within its respective block (see FIG. 3a).

Referring to FIG. 2b, inserts 38,40 are removable as described so that they may be easily and quickly replaced with other inserts having different shapes. This is since each insert is shaped to accommodate a specific eye shape and head wrap of a particular frame style. The internal cavities 38a, 40a of the upper and lower cavity inserts 38,40 are thus sized and shaped to substantially the same size and shape as the circumference of the lens 58, and the facing surfaces 37,43 thereof are curved to match the shape of the head wrap of the frame 16. These features of the invention will be discussed further below.

Figure 2C:
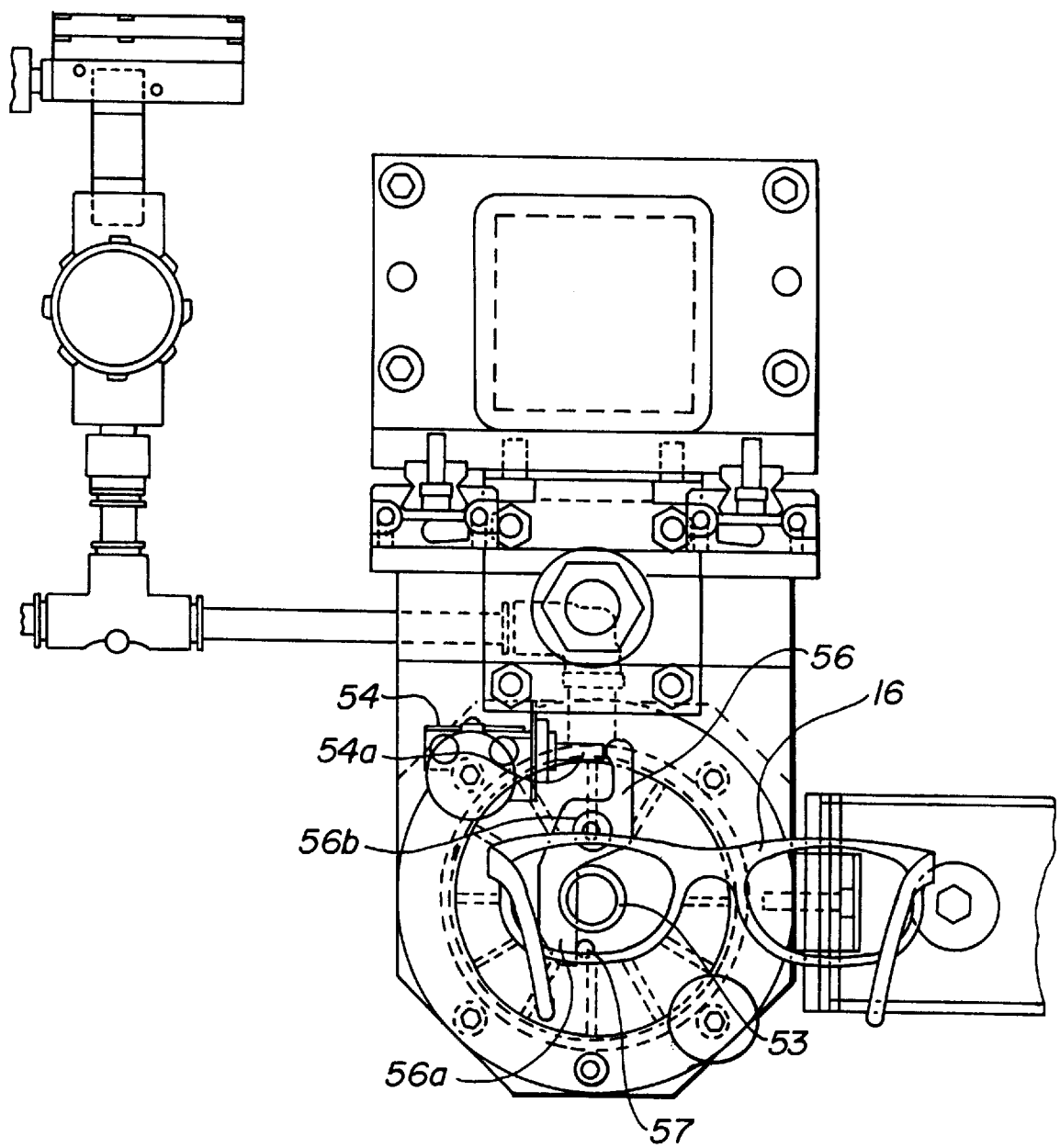
FIG. 2c is a top plan view of FIG. 2b.

A lens-seating surface 48 is reciprocally movable within the internal cavity 40a of lower insert 40 by a second pneumatic ram 50 to which the lens-seating surface attaches, with ram 50 positioned therebeneath and extending through work surface 18, lower block 28, and insert 40. A stretching cone 52 is positioned at different times in the machine cycle within the upper block insert cavity 38a and the lower block insert cavity 40a as described more fully below. Means releasably engaging stretching cone 52 within upper insert cavity 38a are provided in the form of a stem 53 attached to cone 52 and a pivoting lever 56 mounted atop upper block 26 which releasably engages stem 53. More particularly, as seen most clearly in FIG. 2b, stem 53 having a head portion 53a and a notch 53b extends from the top surface 52a of stretching cone 52. Upper insert 38 includes a cavity wall 38b having a central hole 38c through which stem 53 extends in the inserted position of cone 52 within insert cavity 38a. Upper block 26 likewise includes a wall 26b having a central hole 26c which aligns with hole 38c. A single action, air-actuated cylinder 54 having a spring-loaded piston 54a is provided atop wall 26b which attaches to and controls the movement of lever 56 having a curved finger portion 56a for engaging the notch 53b of stem 53 (see also FIG. 2c), and thus retaining cone 52 within upper insert cavity 38a. Piston 54a is normally retracted with lever 56 in the engaged position seen in FIG. 2c. Upon actuation of cylinder 54, piston 54a extends, thereby causing lever 56 to pivot about point 56b and finger portion 56a releasing from notch 53b, at which point cone 52 will release from upper insert 38.

The sequence of operation of machine 12 is as follows:

The lens-insertion process starts with stretching cone 52 located within upper insert cavity 38a (FIG. 3b), and both ram plungers 32 and 50 in their fully retracted positions wherein upper block 26 is raised relative to lower block 28, and lens-seating surface 48 lies below the upper-most edge 43 of lower insert 40 (FIG. 2b). Worker 14 then takes a lens 58 from tray 20 and places the lens 58 atop the lens-seating surface 48 in the internal cavity 40a of lower insert 28. (Worker 14 may perform the same step on machine 12' simultaneously). With the lens 58 sitting freely atop lens-seating surface 48, worker 14 then starts the initial machine cycle by depressing the right and left start buttons 60,60' simultaneously. In this initial cycle, machine 12,12' only activates first ram 34 which extends upper block 26 to a position closely adjacent lower block 28. At this time, air cylinder 54 is actuated causing lever 56 to pivot about point 56b and thereby release stretching cone 52 from upper insert 38, at which time the lower surface 52b of cone 52 is placed in contacting, covering relation to lens 58 in lower insert 40. Once this occurs, ram 34 retracts which again raises the upper block 26 away from lower block 28, leaving stretching cone 52 in lower insert cavity 40a atop lens 58. At this time, machine 12,12' has completed the initial "lens loading" cycle and remains stationary (idle) while waiting for worker input.

Referring to FIG. 1, the worker 14 at this time takes a frame 16 from the heating unit 24 and places an eye opening 16a of frame 16 over the stretching cone 52 in the lower block 28. It is noted the diameter of the upper surface 52a of cone 52 is smaller than the diameter of the eye opening 16a in the unstretched state, while the lower surface 52b thereof is larger than the diameter of the eye opening 16a in the unstretched state. As such, the eye opening 16a will come to rest somewhere between the upper and lower surfaces 52a and 52b of stretching cone 52 in the unstretched state of the frame (see FIG. 2b).

As seen in FIG. 2a, the same process of loading a heated frame 16' onto stretching cone 52' is performed, preferably simultaneously, on machine 12'. The only difference is that the opposite eye opening 16b' is placed on cone 52'. This is so that once the lens-insertion cycle of the machine is complete, the frames 16,16' may be switched on machines 12,12' to perform the lens insertion cycle on the opposite eye opening.

Once frame 16 is in position over the stretching cones 52, the worker 14 again depresses right and left buttons 60,60' simultaneously which initiates the lens insertion mode of the machine cycle. At this time, ram plunger 32 extends to lower upper block 26 to a position closely adjacent lower block 28. In the fully lowered position of upper block 26 seen in FIG. 3a, the frame portion surrounding the eye opening 16a of frame 16 becomes sandwiched between the facing surfaces 37 and 43 of the upper and lower inserts 38,40, respectively. It is noted a rest 62 is provided on the work surface 18 adjacent the lower block 28 to support the opposite eye opening 16b at this time (see FIGS. 2a,2b). To prevent stresses on the frame, rest 62 is adjustable about a pivot connection 63 via a vertical screw component 65. Rest 62 is thus adjusted as necessary depending on the particular wrap of the frame.

Once ram plunger 32 has fully extended and frame 16 is sandwiched between facing surfaces 37,43 of upper and lower inserts 38,40, the second ram plunger 50 begins to extend which raises the lens-seating surface 48, and thereby raises the lens 58 and stretching cone 50 within lower insert 40, all relative to the frame 16 which remains stationary between the facing surfaces of the upper and lower inserts 37,40, respectively. Thus, as ram 50 extends, stretching cone 52 is pushed through the eye opening 16a of the frame 16. In this regard, it is noted the circumferential shape of the stretching cone 52 is substantially the same as the shape of the eye opening 16a,b. Also, since the diameter of stretching cone 52 increases toward the bottom surface 52b thereof, cone 52 gradually stretches the eye opening 16a to this diameter which is sufficiently large to insert lens 58 therein. With the shapes of the cone 52 and eye opening 16b being equal, cone 52 applies a substantially constant radial force about the full perimeter of the eye opening as it is forced therethrough by machine 12 as described herein. The distance of travel of ram 50 is set so that it will stop once lens 58 has reached the eye opening 16a, at which point lens 58 is completely circumscribed by the frame portion defining the eye opening 16a.

At this point, the upper stem 53 of stretching cone 52 has traveled through holes 38c and 26c and is engaged and retained within upper insert 38 by spring-loaded lever 54. With lens 58 thus inserted into the frame eye opening, first ram plunger 32 again retracts which raises upper block 26 and insert 38 (taking cone 52 with it), thereby revealing the frame with inserted lens (see FIG. 3b). This completes the full lens-insertion cycle of the machine. As the frame cools, the portion thereof surrounding the eye opening 16a shrinks to its unstretched state, thereby radially compressing and securing lens 58 therein.

In the work station embodiment shown in FIG. 1, the above-described lens-insertion operation of machine 12 is executed simultaneously on a second frame 16' by machine 12' which is run in synchronism with machine 12. Once the lens-insertion cycle has been completed on eye opening 16a of frame 16 and 16b' of frame 16', the worker switches the frames 16 and 16' upon machines 12 and 12', respectively, in order to perform the same operation on the opposite eye opening 16b and 16a' of each, respectively. Once this has been accomplished, each frame 16,16' has both lenses inserted therein and may be transferred to other work stations as required (e.g., to a temple attachment station if no temple has been previously attached).

A lens-insertion cycle is performed on only one eye opening of a single frame at a time according to the present invention. This is to prevent stresses at the bridge area 16c of the frame 16 which would otherwise occur should both eye openings 16a and 16b be stretched simultaneously.

The present invention thus provides a quick and efficient method of inserting a pair of lenses into a plastic frame front which requires very little effort on the part of the worker as compared to a total manual insertion technique which has been the standard in the industry to date. A further benefit of the present system is that the frame does not need to be heated as high as in the total manual method since the amount of ductility required for the inventive process is not as high as is required with the total manual method. In fact, some frame styles, depending on their thickness, may not need to be heated at all using the inventive method. Also, the rate of accidental damage to the frame during the leans insertion process is lower due to the lower frame heat factor as well as in the consistency of handling the frame which is inherent in the automated process of the present invention.

What is claimed is:

1. Apparatus for inserting a lens into the eye opening of an eyewear frame front, said apparatus comprising:

a) a lens-seating surface adapted to removably receive said lens thereon, prior to insertion of said lens into said eye opening;

b) means for selectively moving said lens-seating surface together with said lens along a first axis;

c) means for stretching said eye opening radially outwardly in response to moving said lens-seating surface a predetermined distance along said axis in a first direction, said stretching means thereby stretching said eye opening and said lens becoming located within said eye opening.

2. The apparatus according to claim 1 wherein said stretching means comprises a stretching cone having a tapered outer circumference extending between opposite top and bottom surfaces thereof, said outer circumference having an outline in substantially the same shape as the outline of said eye opening.

3. The apparatus of claim 2, and further comprising a lower block having an internal cavity wherein said lens-seating surface is movably located with respect to said lower block.

4. The apparatus of claim 3 and further comprising an upper block having an internal cavity wherein said stretching cone may be removably located.

5. The apparatus of claim 4, and further comprising means for reciprocally moving said lower and upper blocks toward and away from each other.

6. The apparatus of claim 5 wherein said reciprocal moving means comprises a second pneumatic ram which connects to said upper block.

7. The apparatus of claim 6, and further comprising a pair of inserts removably located in said upper and lower blocks, respectively, said inserts each having facing surfaces and an internal cavity aligned along a common vertical axis x—x, said lens-seating surface being movable within said insert of said lower block, and said stretching cone being movable between said inserts.

8. The apparatus of claim 7 wherein said internal cavities of said inserts substantially match the outline shape of said lens.

9. The apparatus according to claim 8 wherein said eyewear frame front remains substantially stationary relative to the movement of said lens-seating surface during said stretching of said eye opening and said locating of said lens within said eye opening thereof.

10. The apparatus of claim 9 wherein said the portion of said eyewear frame front defining said eye opening is sandwiched between said facing surfaces of said inserts when said blocks are in said adjacent relationship to one another.

11. The apparatus of claim 10 wherein said facing surfaces of said inserts substantially match the shape of the portion of the eyewear frame front surrounding said eye opening.

12. The apparatus of claim 1, wherein said frame includes a pair of eye openings, and further comprising a rest for supporting the other one of said eye opening during insertion of said lens into said eye opening.

13. The apparatus of claim 7, and further comprising means for selectively, releasably retaining said cone in said insert of said upper block.

14. The apparatus of claim 13 wherein said releasable retaining means comprises a mechanical lever located on said upper block, said lever including a finger portion for engaging said cone.

15. The apparatus of claim 14 wherein said cone includes a stem having a notch wherein said finger portion of said lever releasably engages.

16. The apparatus of claim 15 and further comprising an air-actuated cylinder operably connected to said lever.

* * * * *